United States Patent [19]

Bargeton et al.

[11] Patent Number: 4,815,101

[45] Date of Patent: Mar. 21, 1989

[54] STEP-BY-STEP REMOTE LOCATING SYSTEM FOR REPEATERS IN A PCM LINK

[75] Inventors: Gilbert L. Bargeton; Eric F. H. Lamaignere, both of Paris, France

[73] Assignee: Societe Anonyme de Telecommunications (S.A.T.), Paris, France

[21] Appl. No.: 76,816

[22] Filed: Jul. 23, 1987

[30] Foreign Application Priority Data

Jul. 24, 1986 [FR] France ................... 86 10758

[51] Int. Cl.$^4$ ............................... H04B 3/36
[52] U.S. Cl. ....................... 375/3.1; 370/15; 379/4
[58] Field of Search ............ 375/3, 3.1, 4; 379/4.5; 370/15, 13, 97

[56] References Cited

U.S. PATENT DOCUMENTS

| | | | |
|---|---|---|---|
| 3,649,777 | 3/1972 | Matsushima | 375/3.1 |
| 4,161,635 | 7/1979 | Wolaver | 370/15 |
| 4,336,610 | 6/1982 | Steiner | 370/15 |
| 4,355,215 | 10/1982 | Legras et al. | 375/3.1 |
| 4,402,075 | 8/1983 | Bargeton et al. | 370/15 |
| 4,529,979 | 7/1985 | Kusama et al. | 370/15 |

Primary Examiner—Robert L. Griffin
Assistant Examiner—Stephen Chin
Attorney, Agent, or Firm—Lowe, Price, LeBlanc, Becker & Shur

[57] ABSTRACT

A step-by-step locating system for a digital bidirectional transmission link includes repeater pairs between a monitoring end equipment and a remote monitored end equipment. When a repeater pair is connected via a loop-back path to the monitoring end equipment thereby testing the repeater pair, the next repeaters are also connected to the monitoring equipment by closure of associated switches. Such a condition avoids the need for matching with maximum amplification gain in equalizers of the next repeaters, which could cause a fault in the regeneration of remote locate sequences or untimely looping in the next pairs after testing of the looped repeater pair. In practice, any interruption of the digital signal in remote locate sequences transmitted by the monitoring equipment does not exceed a width such that no matching with maximum gain is generated.

5 Claims, 3 Drawing Sheets

STEP-BY-STEP REMOTE LOCATING SYSTEM FOR REPEATERS IN A PCM LINK

BACKGROUND OF THE INVENTION

1. Field of the Invention

The present system relates to improvements to a step-by-step remote locating system for repeater pairs in a PCM link.

2. Description of the Prior Art

More particularly, the invention concerns a system for step-by-step remote locating pairs of first and second repeaters included in a bidirectional digital transmission medium between first and second end equipments. Such a remote locating system is disclosed in U.S. Pat. No. 4,402,075.

In this system, the transmission medium is a link comprising a first transmision channel in which the first repeaters are interconnected via first respective switches which are closed thereby transmitting a first digital signal from the first equipment to the second equipment, and a second channel in which the second repeaters are interconnected via second respective switches which are closed thereby transmitting a second digital signal from the second equipment to the first equipment.

The first equipment comprises a means including a remote locate sequence generator and a central remote control unit for chopping the first digital signal with interruption sequences. Each of the sequences comprises k first interruptions having a predetermined width and a last interruption preceded respectively by k first signal fields having a predetermined width and a last field k, where k is an integer. r sequences are transmitted consecutively in the first channel to remote locate a pair of repeaters defined by an integer rank r counted from the first equipment. The last field of the last of the r sequences has a width greater than that of the other signal fields.

Each pair of first and second repeaters is associated with a means including a timing circuit and a counter-decoder for counting the interruptions in each sequence and with a means including a retriggerable monostable flip-flop for resetting the counting means in response to an interruption in the first signal having a first width exceeding the sum of the widths of a first field and a first interruption in a sequence. The counting means commands the opening of the respective first switch thereby disconnecting the first respective repeater from the first repeater of following rank, and an opening of the second respective switch thereby disconnecting the second respective repeater from the second repeater of following rank and connecting said first and second respective repeaters of said pair through a respective loop-back path as soon as the counting means has reached a total equal to k. The counting means also commands closure of the respective first and second switches when the count is other than k.

In this system, when a pair of repeaters is remote located, which results in a link via the loop-back path between the repeaters of this pair for transmission of a digital test slignal on the second channel to the first end equipmen, said test signal being initially transmitted by this first equipment on the first channel, the first respective switch means is open. In other words, the first repeater of said pair is disconnected from the first following repeaters of higher rank next to the second equipment, throughout the duration of the remote located pair test.

As is known, each repeater comprises a self-matching equalizer including a variable gain amplifier, called as a channel section corrector, and an automatic gain control circuit (AGC) for compensating the attenuation of the digital signal received via the respective channel section. Given that the last signal field in the last remote location sequence contains a digital test signal which is intended to be analyzed by the first equipment in order to detect faults in the located repeater pair and that this latter field has a relatively long duration, the gain control circuits in the first repeaters disconnected from the first end equipment react as if the first channel sections preceding them were extremely long, greater than the maximum length of the channel sections. In this case, the amplification gain of the equalizers in the disconnected repeaters is maximum. This same maximum gain phenomenon occurs in the system described in U.S. Pat. No. 4,402,075, when one of the repeater pairs preceding the pair to be remote located is momentarily looped, the width of the last sequence interruption being considerably greater than the width of the other interruptions of the sequence.

It so happens that disconnection of the first repeaters from the first end equipment by opening of the respective first switches or by opening of the first switch of a remote located pair, can in practice cause untimely looping of the disconnected repeater pairs owing to a noise signal, and/or trigger a regeneration fault in the remote location sequence transmitted after unlooping of a previous pair, because of the maximum gain in the gain control circuit which does not allow suitable regeneration and therefore correctrepeating of a remote locate sequence.

OBJECTS OF THE INVENTION

The main object of this invention is to remedy the above mentioned drawbacks.

Another object of this invention is to ensure that any interruption of the first digital signal transmitted in the first repeaters, including those with a rank higher than that of a pair of repeaters to be remote located, is less than a width such that it causes no matching with the maximum amplification gain.

SUMMARY OF THE INVENTION

Accordingly, there is provided a step-by-step remote locating system wherein each pair of first and second repeaters is associated with a means for detecting fields of the first signal having a second width greater than said sum of the widths of a first field and a first interruption in a sequence. The detecting means commands closure of the first respective switch as sooon as a field of the first signal exceeds said sum and when the count in the associated counting means is equal to k, and commands resetting of the associated counting means as soon as a field of the first signal exceeds said sum and when the count in the associated counting means is other than k.

BRIEF DESCRIPTION OF THE DRAWING

Further features and advantages of the invention will be more clearly apparent from the following particular description of several preferred embodiments of this invention in reference to the corresponding accompanying drawings in which.

DESCRIPTION OF THE PREFERRED EMBODIMENTS

Figure 1:
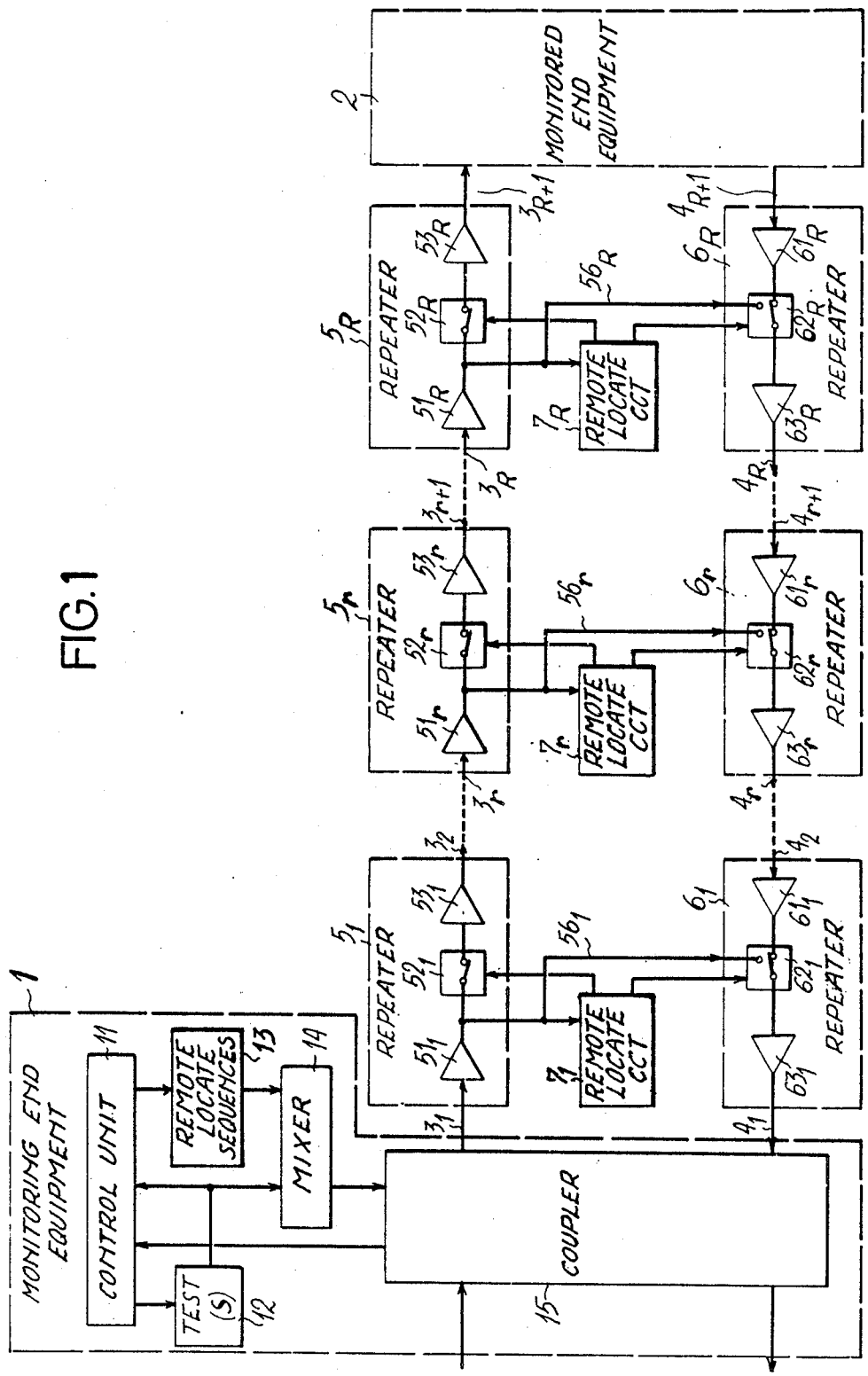
FIG. 1 is a schematic block diagram of a remote locate system for a cabled PCM digital link.

The remote locate system illustrated in FIG. 1 concerns a 2048 kbits/s bidirectional PCM digital communication medium between a first equipment in the form of a monitoring end equipment 1 and a second equipment in the form of a remote monitored end equipment 2. Between these two end equipments 1 and 2, the communication medium is a four-wire line comprising a first channel, called as a forward coaxial line channel, for transmitting a first PCM digital signal from equipment 1 to equipment 2, and a second channel, called as a data backward coaxial line channel for transmitting a second PCM digital signal from equipment 2 to equipment 1. The line is divided into R+1 pairs of line sections $3_1$–$4_1$ to $3_{R+1}$–$4_{R+1}$ marked out by R pairs of repeaters $5_1$–$6_1$ to $5_R$–$6_R$ along the line. Line sections $3_1$ to $3_{R+1}$ and repeaters $5_1$ to $5_R$ are assigned to the forward channel and sections $4_{R+1}$ to $4_1$ repeaters $6_R$ to $6_1$ are assigned the backward channel. Line sections $3_1$ and $4_1$ and line sections $3_{R+1}$ and $4_{R+1}$ are connected to the monitoring equipment 1 and the remote monitored equipment 2 respectively.

As illustrated in FIG. 1, each of the forward repeaters, such as repeater $5_r$, where r is an integer varying from 1 to R, consecutively comprises, starting from the previous section $3_r$ of the forward channel, an input circuit $51_R$, an interruption circuit $52_r$ schematically represent by a switch, and an output circuit $53_r$ connected to the next section $5_{r+1}$ of the forward channel. Input circuit $51_r$ comprises an input matching transformer followed by a self-matching equalizer with automatic gain control (AGC) circuit, and a rate regeneration and recovery circuit. The output circuit $53_r$ comprises an amplifying circuit and an output transformer. In the backward channel, each of the backward repeaters, such as repeater $6_r$, comprises consecutively, starting from previous section $4_{r+1}$, an input circuit $61_r$, a switching circuit $62_r$ schematiclaly represented by a commutator having two fixed input contacts and a movable output contact, and an output circuit $63_r$ connected to the next section $4_r$ of the backward channel. Input circuit $61_r$ comprises a matching transformer followed by a self-matching equalizer with automatic gain control circuit. Starting from the output contact of commutator $62_r$, output circuit $63_r$ comprises a rate regeneration and recovery circuit, a amplifying circuit and an output transformer.

Figure 2:
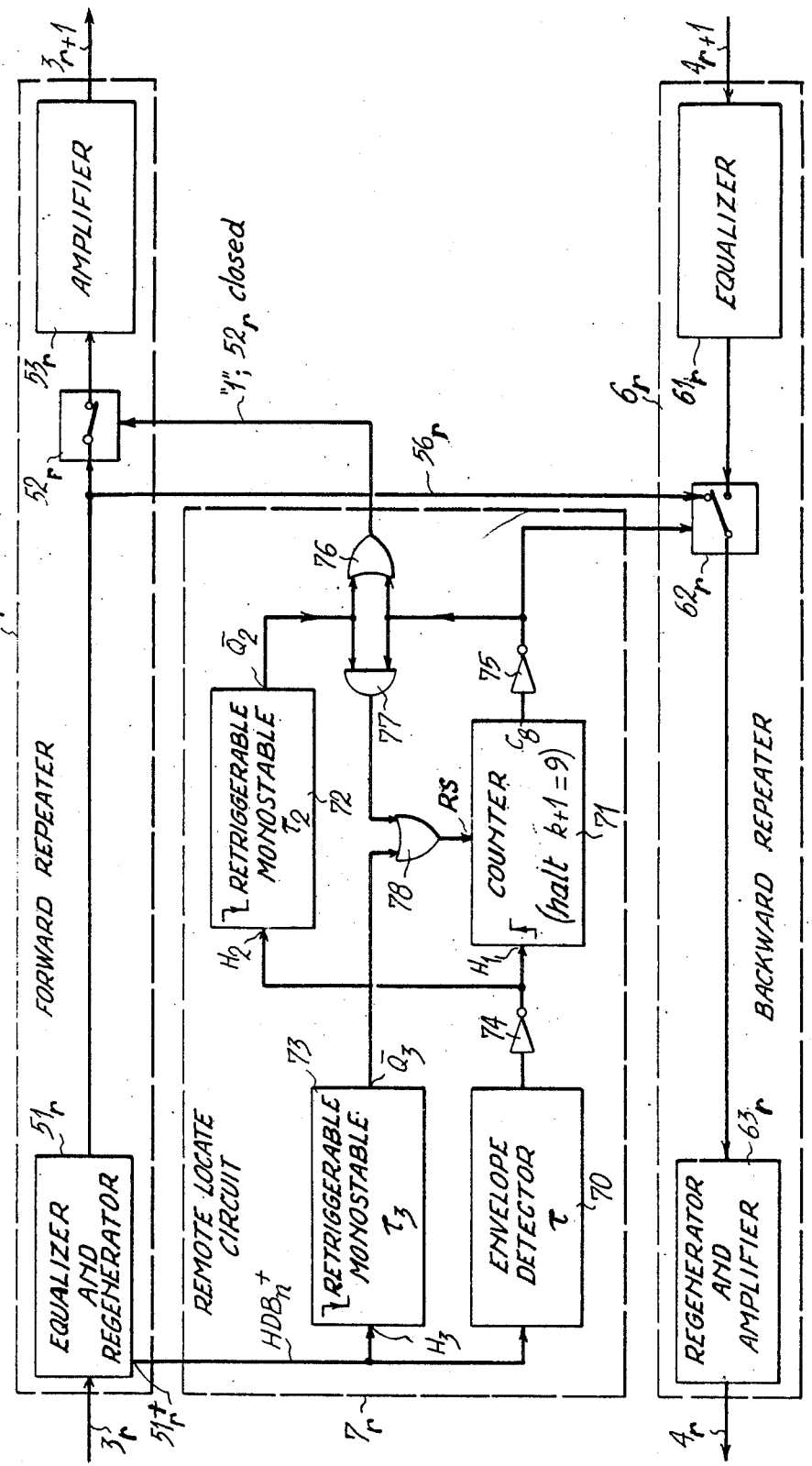
FIG. 2 is a schematic block diagram of a remote locate circuit included in a repeater pair of the link.

Each repeater pair, such as pair $5_r$–$6_r$, is associated with a respective remote locate circuit $7_r$ chiefly intended for controlling switch $52_r$ and commutator $62_r$ and looping the link from monitoring end equipment 1 via loop-back path $56_r$ between repeaters $5_r$ and $6_r$. As schematically shown in FIG. 2, the remote locate circuit essentially comprises an envelope detector 70, a counter 71, two retriggerable monostable flip-flops 72 and 73 and other logic components 74 to 78.

An input of the envelope detector 70 and an input of clock $H_3$ of flip-flop 73 are connected to an output $51_r{}^+$ of input circuit $51_r$. Output is in fact that of the corresponding regeneration circuit transmitting one of two regenerated binary signals obtained from the PCM digital signal transmitted by section $3_r$ of the forward channel. Here we assume that the digital signal is encoded with a high-density bipolar HDBn line code, and that the binary signal delivered by output $51_r{}^+$ corresponds to an HDBn$^+$ signal, which is only at state "1" in response to the positive bipolar marks on digits in the encoded signal. It is recalled that an HDBn coded signal can only contain n consecutive zero digits, and therefore the HDBn$^+$ signal can only contain (2n+1) consecutive zero digits, corresponding to a period of 3.4 μs for the HDB3 code to which we will refere hereinafter.

The envelope detector 70 is chiefly intended for inhibiting any break or interruption which may normally exist in the PCM digital signal on the forward channel, so that they are not taken into account by counter 71 and do not trigger flip-flop 72. Such an interruption corresponds to n=3 consecutive zero digits in the line signal and therefore to 2n+1=7 consecutive zero digits in the HDB3$^+$ signal. Furthermore, in order to avoid such counting and triggering by unwanted microbreaks in the digital signal, due for example to possible errors during signal regeneration in the repeaters, the response time τ of detector 70 is made considerably larger than the duration of 3.4 μs, but smaller than microbreaks in a remote locate sequence defined hereinafter. Typically, τ is between 30 μs and 250 μs. Thus detector 70 delivers a detected binary signal corresponding to the digital signal transmitted on the line and having no microbreaks shorter than τ, or more precisely, having microbreaks corresponding to those included in the first digital signal transmitted but having a width reduced by τ from the falling edges of these microbreaks.

Clock inputs $H_1$ and $H_2$ of counters 71 and flip-flop 72 are connected to the output of detector 70 via an inverter 74.

Input $H_1$ is triggered by rising edges of the detected signal corresponding to falling edges of the first transmitted digital signal. Counter 71 counts the microbreaks or interruptions in the detected signal in order to detect k=8 first periodic microbreaks and one (k+1)=9th microbreak in a remote locate sequence. An output $C_8$ of counter 71 is at state "1" only when the counter count is equal to k=8. Counter 71 is turned off when its count is equal to k+1=9.

Flip-flop 72 is a monostable flip-flop which can be retriggered by falling edges of the signal outgoing from inverter 74 and corresponding to rising edges of the first transmitted digital signal. An inverse output $\overline{Q}_2$ of flip-flop 72 is at a state "0" in response to a falling edge at input $H_2$, this "0" state remaining until the end of a time constant $\tau_2$, during which no falling edge is presentn at input $H_2$.

Output $C_8$ of counter 71 and output $\overline{Q}_2$ of flip-flop 72 are connected via an inverter 75 and directly to the first and second inputs of an OR gate 76 and an AND gate 77 respectively. An output of the OR gate 76 controls switch $52_r$, while an output of inverter 75 controls commutator $62_r$. In normal operation, as shown in FIG. 1, for repeaters $5_1$ and $6_1$ or $5_r$ and $6_r$, when the counter count is other than k=8, the output of inverter 75 is at state "1" and "closes" commutator $62_r$ to connect the output of input circuit $61_r$ to the input of output circuit $63_r$ in the backward channel, and disconnect the output of input circuit $51_r$ from the input of output circuit $63_r$. Also in normal operation, output $C_8$ at state "0" controls closure of switch $52_r$, via inverter 75 and gate 76 whose output is at "1", in order to connect the output of input circuit $51_r$ to the input of output circuit $53_r$ in the forward channel.

The second monostable flip-flop 73 has a clock input $H_3$ which is retriggerable by falling edges of the HDB3+ signal delivered by terminal $51_r+$. Flip-flop 73 has a time constant $\tau_3$ less than $\tau_2$. An inverse output $\overline{Q}_3$ of flip-flop 73 thus goes to "0" in response to a falling edge in the digital signal on the forward channel, including for falling edges preceding a series of "0" digits in the digital signal. The $\overline{Q}_3$ output and an output of AND gate 77 are connected respectively to two inputs of OR gate 78 having one output connected to a zero reset input RS of counter 71. Counter 71 is zero reset in response to a "1" state at the output of gate 78.

It is recalled that, as in the system described in U.S. Pat. No. 4,402,075, end equipments 1 and 2 comprise circuits required for repeater remote location, repeater remote supply if the link is a cable line, generation of special digital test signals, such as pseudorandom signals, so as to detect faults in the forward and backward channels, producing of an alarm indication signals (AIS) which is transmitted outside the link in response to fault detection, and transmission of an switching inhibition signal (S.I.S.) originating outside the link. In particular, monitoring end equipment 1 comprises a control unit 11, preferably extractable, including a microprocessor, an alphanumerical keyboard and a display board, so that an operator can automatically or manually control step-by-step remote location of a repeater pair of given rank 1 to R, and select a test signal and analysis programs for given circuits of the remote located repeaters. As shown in FIG. 1, equipment 1 in particular includesa test signal generator 12, a remote locate sequence generator 13, a signal mixer 14 and a coupler 15.

Figure 3:
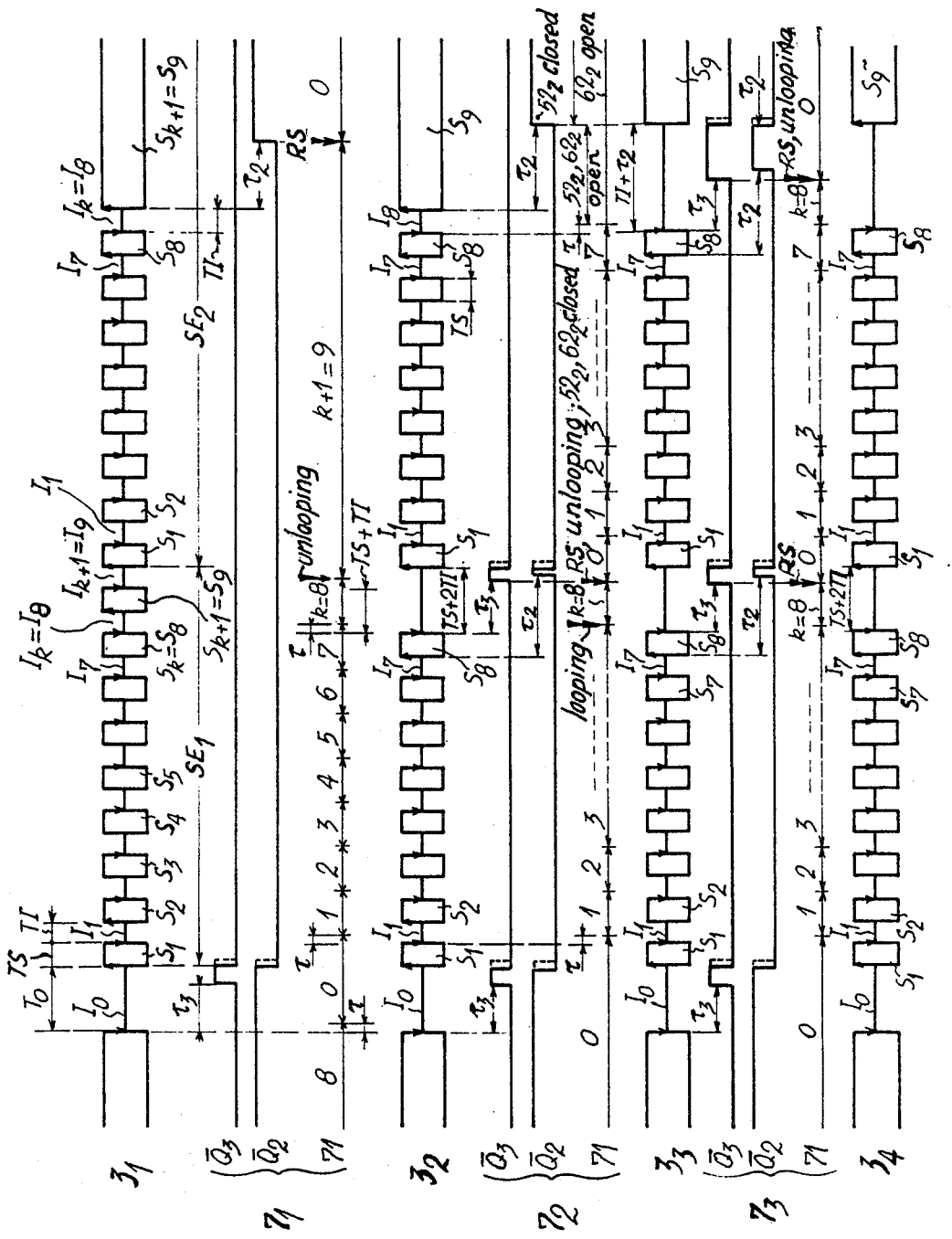
FIG. 3 is a waveform diagram of the remote locate signals and various logic signals received and derived by three first repeater pairs in the link, respectively.

As shown in the first line of FIG. 3, a remote locate signal comprises remote locate sequences SE each of which is intended to loop, and possibly test, then unloop a respective repeater pair. An SE sequence is composed of $k+1=9$ fields $S_1$ to $S_9$ including test signal portions and corresponding to test pulses at state "1" of a remote locate chopping signal derived by generator 13. Each of fields $S_1$ to $S_8$ and field $S_9$, when this latter precedes another sequence, has a predetermined width TS and precedes an interruption or microbreak without test signal $I_1$ to $I_9$ having a predetermined width TI, in practice equal to TS. The chopping signal derived by generator 13 is thus a pulsed signal which in the mixer 14, chops the test signal produced by the generator 12 into the remote locate signal outgoing from the mixer 14. The remote locate signal is transmitted in the first section $3_1$ of the forward channel via coupler 15, and is partially recovered by the control unit 11 from section $4_1$ of the backward channel when a repeater pair is looped. Apart from the switches for inserting and recovering the test signal, the coupler 15 can also comprise a pair of repeaters. In this case, the repeater pair in the coupler plays the role of the first pair $5_1$–$6_1$. Similarly, the last repeater pair $5_R$–$6_R$ can be included in a remote end equipment 2 coupler.

With reference to FIGS. 2 and 3, remote location of a repeater pair, such as the second pair $5_2$–$6_2$ is as follows.

Before transmission of two remote locate sequences $SE_1$ and $SE_2$ intended respectively for fleeting looping and unlooping of the first repeater pair $5_1$–$6_1$ and looping and testing of the second repeater pair $5_2$–$6_2$ to be remote located, the remote locate signal comprises a wide interruption $I_0$ having a width $T_0$ greater than $\tau_3$ and preceding the last field $S_1$ in the first sequence $SE_1$. In response to the falling edge of interruption $I_0$, all the second flip-flops 73 in circuits $7_1$ to $7_R$ are triggered and the $\overline{Q}_3$ outputs of these flip-flops pass to "1" after a period $\tau_3$, less than $T_0$, until the first-falling edge appears in field $S_1$ of sequence $SE_1$. State "1" of the $\overline{Q}_3$ outputs zero-resets all the counters 71. This zero-reset is in particular used to reset a counter in a previously remote located repeater pair in which the switch and the commutator of the forward and backward channels were closed and open respectively. A counter whose count passes from $k=8$ to $k+1=9$ in response to the falling edge of interruption $I_0$ also passes to zero, since $T_0 > \cdot > \tau$.

Following the first rising edge in field $S_0$ of the first sequence $SE_1$, all the first flip-flops 72 in circuits $7_1$ to $7_R$ are triggered and their $Q_2$ outputs remained at state "0" for as long as the rising edges of the remote locate signal follow one another with a duration less than $\tau_2$; this is done at least for all the rising edges of fields $S_1$ to $S_8$ of their first sequence $SE_1$, since there is $\tau_2 > TS+TI$.

In response to the falling edges of interruptions $I_1$ to $I_k = I_8$ in the first sequence $SE_1$, the counts of all the counters 71 in circuits $7_1$ to $7_R$ go from 1 to $k=8$. The $\overline{Q}_2$ outputs remain at "0" and the counters 71 are not zero-reset via gates 77 and 78. Output $C_8$ of the counters remains at "0" until $k=8$ interruptions have been counted, and therefore all switches $52_1$ to $52_R$ and commutators $62_1$ to $62_R$ remain closed.

In response to the falling edge of interruption $I_k = I_8$ in the first sequence $SE_1$, the $C_8$ outputs of all the counters 71 are at state "1" and therefore the outputs of OR gates 76 are at "0" in order to open switches $52_1$ to $52_R$, and the outputs of the inverters 75 are at state "0" to open commutators $62_1$ to $62_R$. The first repeater pair $5_1$–$6_1$ is then looped by the loop-back path $56_1$ between the output of circuit $51_1$ and the input of circuit $63_1$, this looping remaining until the count of counter 71 in circuit $7_1$ passes to $k+1=9$ in response to the falling edge of interruption $I_{k+1} = I_9$. The looping of the first repeater pair $5_1$–$6_1$ thus inhibits transmission of the field of test signal $S_{k+1} = S_9$ to the other repeaters $5_2$ to $5_R$, as shown in fifth, ninth and thirteenth lines of FIG. 3.

Passage of the count of counter 71 in circuit $7_1$ from $k=8$ to $k+1=9$ on the one hand turns off this counter at $k+1=9$, and it can only be reset by flip-flop 72 of circuit $7_1$ in response to a signal field having a width greater than $\tau_2$, or by flip-flop 73 of circuit $7_1$ in response to an interruption, such as interruption $I_0$, having a width greater than $\tau_3$, and on the other hand, causes closures of switch $52_1$ and commutator $62_1$, and thus unlooping of the repeater pair $5_1$–$6_1$, which enables the next sequence $SE_2$ to be retransmitted to the other repeaters $5_2$ to $5_R$. Thus, at the level of repeaters $5_2$ to $5_R$, the looping and unlooping of repeaters $5_1$ and $6_1$ causes an interruption of width $(TS+2\,IT)$ which is greater than the time constant $\tau_3$ of flip-flops 73. In circuits $7_2$ to $7_R$, the $\overline{Q}_3$ outputs of the flip-flops 73 passes to "1" state after a time $\tau_3$ following the falling edge of interruption $I_k = I_8$ in the sequence $SE_1$ and thus zero-resets the counters 71 in circuits $7_2$ to $7_R$. Consequently, switches $52_2$ to $52_R$ and commutators $62_2$ to $62_R$ are closed, thus unlooping repeater pairs $5_2$–$6_2$ to $5_R$–$6_R$ and allows transmission of the next remote locate sequence $SE_2$ to repeaters $5_2$ to $5_R$. Given that $\tau_2$ is greater than $TI+TS$, the rising edge of field $S_k=S_8$ of sequence $SE_1$ can cause the $\overline{Q}_2$ outputs of flip-flops 72 in circuits $7_2$ to $7_R$ to pass to "1" and thus zero-reset the counters 71 prior to the setting to "1" of the flip-flops 73 in circuits $7_2$ to $7_R$. However, in practice, $\tau_2$ is greater than $TS+\tau_1$, or preferably greater than $2\,TS+2\,TI$ so that the flip-flops 73 are not triggered during looping-unlooping operation of the repeater pair $5_1$-$6_1$.

Sequences similar to sequence $SE_1$ causing a series of similar looping-unlooping operations, i.e., for the end of a sequence $S_r$ of rank r, the loopings and unloopings of repeater pairs $5_r$-$6_r$ to $5_R$-$6_R$, the turning off at $k+1=9$ of counter $71_r$ in circuit $7_r$ and the of counters in circuits $7_{r+1}$ to $7_R$. It thus appears that input circuits $51_1$ to $51_R$ receive no signal for relatively short periods, not exceeding $TS+2\,IT$, included in the series of sequences.

When one wishes to analyze a given repeater pair, such as pair $5_2$-$6_2$, the remote locate sequence of the same rank, such as sequence $SE_2$, has a last signal field $S_9$ having a width exceeding time constant $\tau_2$; during this field $S_9$, the test signal is actually analyzed in the equipment 1 in order to locate faults in the remote located repeater pair.

Thus, as shown in FIG. 3, sequence $SE_2$ is identical to sequence $SE_1$ with the exception of the width of the last field of signal $S_{k+1}=S_9$.

As counter 71 in circuit $7_1$ is turned off at $k+1=9$ after sequence $SE_1$, and the interruptions $I_1$ to $I_9$ of sequence $SE_2$ have a width which does not exceed duration $\tau_3$, and fields $S_1$ to $S_8$ of sequence $SE_2$ have a width $TS$ not exceeding duration $\tau_2$, no looping and unlooping operation will be performed in the repeater pair $5_1$-$6_1$, including after the rising edge of the last field $S_9$. However, during a period $\tau_2$ following the beginning of field $S_9$ of sequence $SE_2$, flip-flop 72 in circuit $7_1$ is no longer triggered owing to the absence of interruptions greater than $\tau$; output $\overline{Q}_2$ of the above mentioned flip-flop 72 passes to "1" and, as output $C_8$ of counter 71 in circuit $7_1$ is at "0", this counter is zero-reset after a period $\tau_2$ following the rising edge of field $S_{k+1}=S_9$ of sequence $SE_2$, as shown in the third and fourth lines of FIG. 3.

Similarly, flip-flop 72 in circuit $7_2$ of the repeater pair to be remote located has a $\overline{Q}_2$ output which passes to "1" after a period $\tau_2$ following the rising edge of field $S_{k+1}=S_9$ of sequence $SE_2$. However, counter 71 in circuit $7_2$ has a count equal to $k=8$, following the falling edge of interruption $I_{k=I8}$ of sequence $SE_2$, which causes looping of the repeater pair $5_2$-$6_2$, by opening switch $52_2$ and commutator $62_2$, as shown in the seventh and eighth lines of FIG. 3. Passage of the above mentioned flip-flop 73 to state "1" opens OR gate 76 and thus closes switch $52_1$ which enables transmission of test field $S_9$ of sequence $SE_2$, except for portion of it of width $\tau_2$ following the rising edge of interruption $I_{8-}=I_k$, to the next forward repeater $5_3$.

In remote locate circuits $7_3$ to $7_R$ of the other repeater pairs, the falling edge of interruption $I_k=I_8$ of sequence $SE_2$ causes loopings in response to counts of counters 71 equal to $k=8$, and the absence of a rising edge interruption $I_k=I_i$ after a period $\tau_3$ causes zero-resetting of counters 71 and unlooping operations, in a manner similar to sequence $SE_1$. However, the time gap between the rising edge of the last normal field $S_k=S_8$ and the rising edge of the next partially inhibited signal field $S_{k+1}=S_9$ is equal to $TS+TI+\tau_2$ and is therefore greater than time constant $T_2$ which is greater than $\tau_1+TS$. As shown in the last five lines of FIG. 3, after unlooping of the repeater pair $5_3$-$6_3$ and before reception of the beginning of field $S_9$ that is really received by repeater $5_2$, output $\overline{Q}_2$ of flip-flop 72 passes to "1" and then to "0" in response to the offset rising edge of received field $S_9$; the state change of output $\overline{Q}_2$, in the same way as a change of state from "1" to "0" by output $\overline{Q}_3$ of flip-flop 73 in circuit $7_3$, does not modify the "0" count of the counter and the output states of inverter 75 and of OR gate 76, which keep switch $52_3$ and commutator $62_3$ closed and consequently allow passage of the partially inhibited field $S_9$ to the next repeater $5_4$.

Similar operations are also performed in the other remote locate circuits $7_4$ to $7_R$, so that the signal field $S_{k+1}=S_9$ used to test repeaters $5_2$-$6_2$ is practice transmitted to the other repeaters $5_3$ to $5_R$. Input circuits $51_3$ to $51_r$ also receive a digital signal having relatively short interruptions, not exceeding $TI+\tau_2$, and consequently the automatic gain control circuits in the forward repeater equalizers do not have sufficient duration to reach maximum gain following microbreaks, which could impair correct copying of the chopping signal transmitted by generator 13.

After the test signal field $S_{k+1}$ of sequence $SE_2$, and interruption $I_0$ allows unlooping of the repeater pair $5_2$-$6_2$ by setting the counter 71 of circuit $7_{2A}$ to $k+1=9$ and then to zero.

As an example, the durations and time constant defined above are as follows for a 2048 kbits/s digital signal:

$T_0 \simeq 1.50$ ms
$TS \simeq 400$ $\mu s$
$TI \simeq TS \simeq 400$ $\mu s$
$30\ \mu u < \tau < 250\ \mu s < TS, TI$
$TS + \tau_3 \simeq 1200\ \mu s < \tau_2 < 2300\ \mu s < T_0$
$TI + TS = 800\ \mu s < \tau_3 < 1200\ \mu s = TS + 2\ TI < T_0$ It should be noted that in a manner substantially similar to the remote location system described in U.S. Pat. No. 4,402,075, a remote locate circuit $7_r$ embodying the invention is protected against all associated repeated pair $5_r$-$6_r$ looping commands by unwanted interruptions due for example to lightning. With reference to FIGS. 2 and 3, looping can only be achieved after counting of $k=8$ interruptions, each having a width of less than $\tau_3 < \tau_2$. If one of $k=7$ unwanted interruptions has a width exceeding time constant $\tau_3$, the output of flip-flop 73 passes to "1" and zero-resets counter 71. If also at least one unwanted interruption interleaves with a remote locate sequence, the monitoring end equipment 1 receives the test signal along the backward channel prior to interruption $I_k=I_8$ normally triggering looping, which is notified to the operator so that he can reinitialize a remote location.

Although a preferred embodiment of the invention has been described, other embodiments could be envisaged by those skilled in the art. The communication medium or link between the end equipments can consist partly or completely of coaxial cables, optical fibers or RF links. The signals transmitted along the link can be analog, that implies analog-digital and digital-analog conversions in the repeaters. Furthermore, a commutator $62_r$ can be replaced by two switches, one in the backward channel, the other in the loop-back path $56_r$ between the forward and backward channels. In the repeater pairs, switch $52_r$ and commutator $62_r$ can be interconnected at locations different from those shown in FIG. 2, for example at the output of output circuit $53_r$ and the input of input circuit $61_r$ respectively. The switches and commutators can be of the relay or transistor type. In remote locate circuit $7_r$, the inputs of detector 70 and flip-flop 73 can receive the HDBn+ signal instead of the HDBn+ signal, or receive signals HDBn+ and HDBn− respectively, or receive the regenerated digital signal via a binary-bipolar converter.

What we claim is:

1. A system for step-by-step remote locating pairs of first and second amplifying means included in a bidirectional digital transmission medium between first and second end means, said transmission medium comprising a first transmission channel in which said first amplifying means are interconnected via first respective switching means which are closed to transmit a first digital signal from said first end means to said second end means, and a second channel in which said second amplifying means are interconnected via second respective switching means which are closed to transmit a second digital signal from the second end means to the first end means, said first end means comprising means for chopping said first digital signal with interruption sequences, each of said sequences comprising k first interruptions having predetermined width and a last interruption respectively preceded by k first signal fields having said predetermined width and a last field, k being an integer, r sequences being transmitted consecutively on said first channel to remote locate an amplifying means pair defined by an integer rank r counted from said first end means, the last field of the last sequence of said r sequences having a width greater than that of the other signal fields, each pair of amplifying means being associated with (1) means for counting the interruptions in each sequence, and (2) means for resetting said counting means in response to an interruption in said first signal having a first width exceeding the sum of the widths of a first interruption in a sequence, and said counting means controlling an opening of the first respective switching means thereby disconnecting said first respective amplifying means from the first amplifying means of following rank, and an opening of the second respective means thereby disconnecting said first respective amplifying means from the second repeater of the following rank and for connecting said first and second respective amplifying means through a respective loop-back path as soon as said counting means reaches a count equal to k, and controlling closures of said respective first and second switching means when said counting means count is different from k, the improvement comprising said detecting means being associated with each pair of first and second amplifying means for detecting said last field of said last sequence having a width greater than that of the other signal fields, and means for controllng the closure of said first respective switching means after a predetermined duration following the beginning of said last field being detected and when said count in said associated counting means is equal to k and for resetting said associated counting means after closure of said switching means and when said count in said associated counting means is different from k, said predetermined duration being greater than said first width and less than a duration necessary for automatic gain control circuits included in said amplifying means to reach a maximum gain.

2. The system claimed in claim 1 wherein said last interruptions have widths equal to said first interruptions, and said last fields in the (r−1) first sequences have widths equal to said first fields.

3. The system claimed in claim 1 wherein said first width is less than the sum of the width of said first fields and double the width of an interruption in a sequence.

4. The system claimed in claim 1 wherein said second width is greater than the sum of said first width and the width of one first field in a sequence.

5. The system claimed in claim 1 wherein said last field detecting means and said controlling and resetting means comprise a monostable flip-flop retriggerable by leading edges of fields of said first signal and having a time constant equal to said second width, an OR gate having two inputs connected to an output of said flip-flop and an output of said counting means respectively, an output of said OR gate controlling said respective first switching means, and an AND gate having two inputs connected to said outputs of said flip-flop and counting means respectively and an output connected to a resetting input of said counting means, said counting means output controlling said second respective switching means.

* * * * *